United States Patent [19]
Morin et al.

[11] Patent Number: 5,337,400
[45] Date of Patent: Aug. 9, 1994

[54] DISTRIBUTION FRAME AND OPTICAL CONNECTOR HOLDER COMBINATION

[75] Inventors: Joseph O. R. Morin, St. Hubert; Joseph F. R. J. Richard, Laval, both of Canada

[73] Assignee: Northern Telecom Limited, Montreal, Canada

[21] Appl. No.: 109,024

[22] Filed: Aug. 19, 1993

Related U.S. Application Data

[63] Continuation of Ser. No. 968,137, Oct. 29, 1992, Pat. No. 5,265,187.

[51] Int. Cl.⁵ .............................................. G02B 6/36
[52] U.S. Cl. ..................................... 385/135; 439/49
[58] Field of Search ................... 324/66, 67, 133, 556, 324/542, 522, 523, 543, 539; 174/50, 59; 439/49, 54, 709; 361/428, 429; 385/135

[56] References Cited

U.S. PATENT DOCUMENTS 5,138,688  8/1992  Debortoli ............................ 385/135
5,265,187 11/1993  Morin et al. ........................ 385/135

Primary Examiner—Rodney B. Bovernick
Assistant Examiner—John Ngo
Attorney, Agent, or Firm—R. J. Austin

[57] ABSTRACT

A combination of distribution frame and optical connector holders receivable in the frame provided with an electrical circuit which permits both ends of a chosen optical fiber patch cord to be located quickly. The patch cords have electrical conductors in addition to optical fibers. After one end of the chosen patch cord is located in one holder, an electrical current is passed along one circuit including the patch cord to result in an indicator lamp being lit on the other holder holding the other end of the chosen patch cord. Using a different circuit, the other end of the chosen patch cord is distinguished from all patch cord ends in the other holder.

1 Claim, 7 Drawing Sheets

DISTRIBUTION FRAME AND OPTICAL CONNECTOR HOLDER COMBINATION

This is a continuation of patent application Ser. No. 07/968,137, filed on Oct. 29, 1992 by J. O. R. Morin, et al for "Distribution Frame and Optical Connector Holder Combination", now U.S. Pat. No. 5,205,187.

This invention relates to distribution frame and optical connector holder combinations.

In the optical telecommunications cable industry in is necessary to connect optical fibers of optical cable entering a customer's premises to optical fibers of a cable installed with the premises. In one general method of effecting such connections, optical fibers are interconnected by mechanical connectors mounted upon optical connector holders or trays. Such holders are, for convenience, sometimes stacked in one or more vertical banks in distribution frames. As examples of this, reference is made to U.S. Pat. Nos. 4,792,203 and 5,071,211. In the former patent a structure is described having a housing or frame in which the holders are pivotally mounted in two horizontally spaced vertical stacks. The holders in each stack are pivotally mounted at forward corners so as to be individually swingable between operative rearward positions within the frame and forward positions outside the front of the frame for accessability of connectors and fibers which are stored by the holders. In U.S. Pat. No. 5,071,211, the holders are slidable fore and aft in distribution frames between operative rearward positions and forward positions for connector access. In the latter patent also, the holders are stacked in vertical banks which are horizontally spaced apart.

A vertical stacking arrangement for optical connector holders maybe used conveniently for complete selective distribution of optical fibers by employing one of the banks as the incoming bank and the other bank as the outgoing bank. Thus, as described in U.S. Pat. No. 5,071,211 optical fibers of an incoming cable are connected to connectors mounted in holders in the incoming bank and optical fibers installed within a customer's premises are connected To connectors in holders in the outgoing bank. With such an arrangement, connectors of one bank are selectively interconnected to connectors of the other bank by patch cords. A problem which may result from this structure is that it may be difficult after installation to locate easily and quickly the other end of a patch cord one end of which has already been identified. Such a requirement is necessary in situations where it is desirable either to replace a patch cord or to change the positions of patch cords, i.e. to change the connectors which the patch cords interconnect. As may be seen this problem increases in difficulty as the number of patch cords increase. As the density of connector interconnections increases in an optical distribution frame, as is desirable, then there will be this increased difficulty in connector location. One example of increased density is that shown by the structure described in U.S. Pat. No. 5,071,211 in which it is possible in a distribution frame size of 84"×26" with holders having up to twelve connectors in each holder, to provide 1440 optical connectors in this space.

The present invention seeks to provide an optical fiber distribution frame and optical connector holder combination which will minimize the location problems referred to above.

Accordingly, the present invention provides a distribution frame and optical connector holder combination comprising: distribution frame means for receiving a plurality of optical connector holders; a plurality of optical connector holders receivable within the frame means, the holders having mounting positions for a plurality of optical connectors with the connectors, when mounted, having first ends which, in different holders are for selective optical interconnection by patch cords extending from connector to connector, and second ends for connection to optical fibers in the holders; and electrical test means operational whereby, when each patch cord interconnects selected first ends of associated connectors and each patch cord is provided with an electrical conductor electrically connected to its associated connectors, the test means is connectible to a chosen connector in one holder to pass an electrical current through an electrical circuit arrangement including the chosen connector, the patch cord conductor connected to the chosen connector, and a corresponding connector at the other end of the patch cord conductor, to provide an indication of the location of the corresponding connector.

In a practical combination according to the invention, the holders are movable into and out of operational positions within the frame means. It is possible for the chosen connectors to be provided in some only of the holders so that other holders have mounting positions only for the corresponding connectors. In these other holders, the test means conveniently has signalling means with a conductor extending from the signalling means to each of the mounting positions. The frame means of this structure has a frame conductor means of the test means and the signalling means of each holder is electrically connected to the frame conductor means with the holder in its operative position. With this arrangement, upon passage of a current from the chosen connector to the corresponding connector, the holder carrying the corresponding connector is identified by current passing through the appropriate signalling means.

In a more practical arrangement, each of the holders may have either a chosen connector or a connector corresponding to a chosen connector. In this particular arrangement, each holder has a signalling means which is electrically connected to the frame conductor means when the holder is in its operative position for the purpose of locating the holder with a corresponding connector.

The test means of the combination according to the invention may conveniently comprise two electrical probes. For the purpose of locating a corresponding connector, one of the probes is connectable electrically to an accessible chosen connector, i.e. within a holder that has been removed from its operative position, for the purpose of identifying the holder having the corresponding connector by passage of current through the associated patch cord conductor to actuate the appropriate signalling means. Upon the holder with the corresponding connector being identified, this holder may then be moved out of its operative position to render the mounting positions for its connectors accessible. With the one probe still being electrically connected to the chosen connector, the other probe is moved as desired from connector to connector in the other holder for the purpose of locating the corresponding connector. The test means includes an indicating means which is actuated upon the other probe electrically contacting the corresponding connector. In this case an electrical circuit is completed through the one probe, the conductor in the associated patch cord, and through the other probe to actuate the indicating means.

One embodiment of the invention will now be described, by way of example, with reference to the accompanying drawings, in which.

Figure 4:
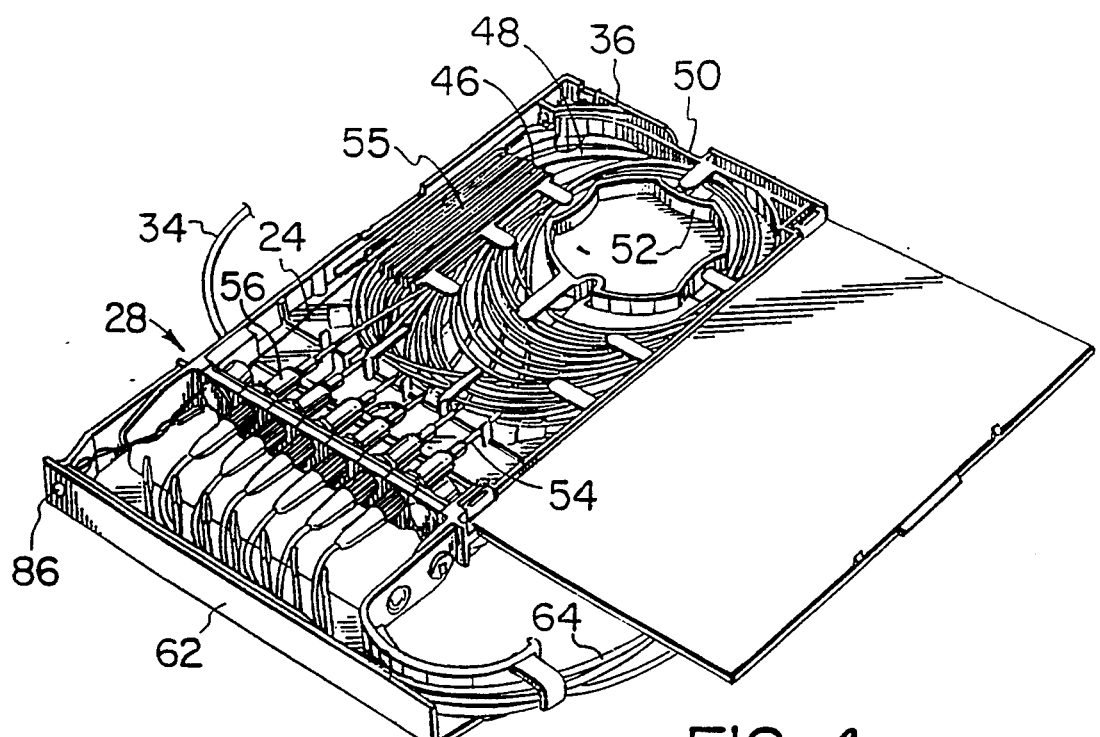
FIG. 4 is an isometric view to a larger scale than in FIG. 3 of an upper side of one of the connector holders with a cover in an open position.
Figure 5:
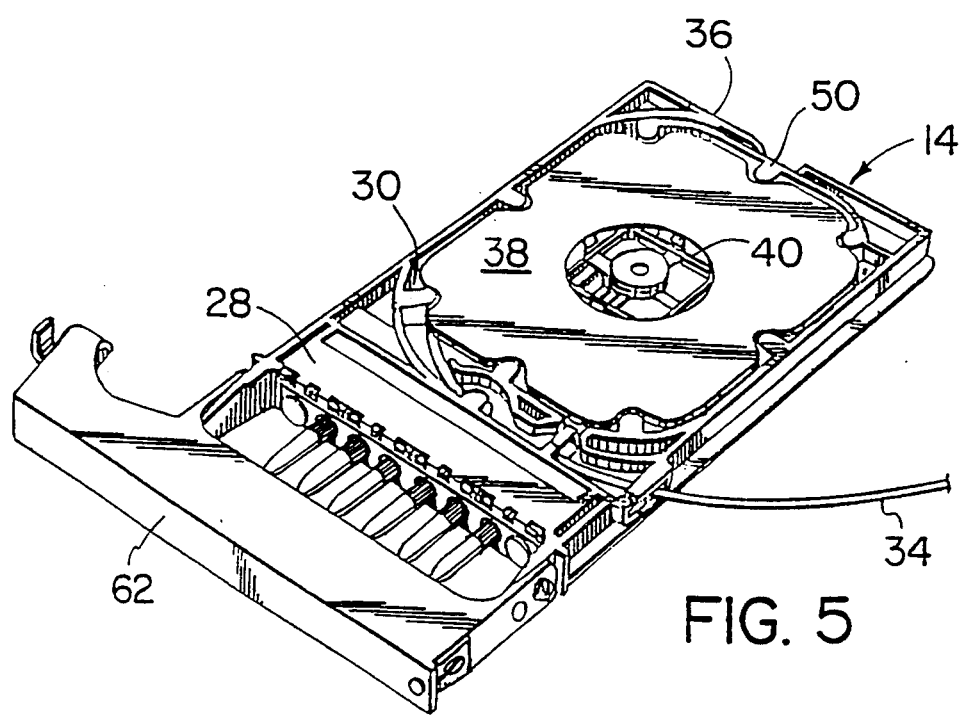
Figure 6:
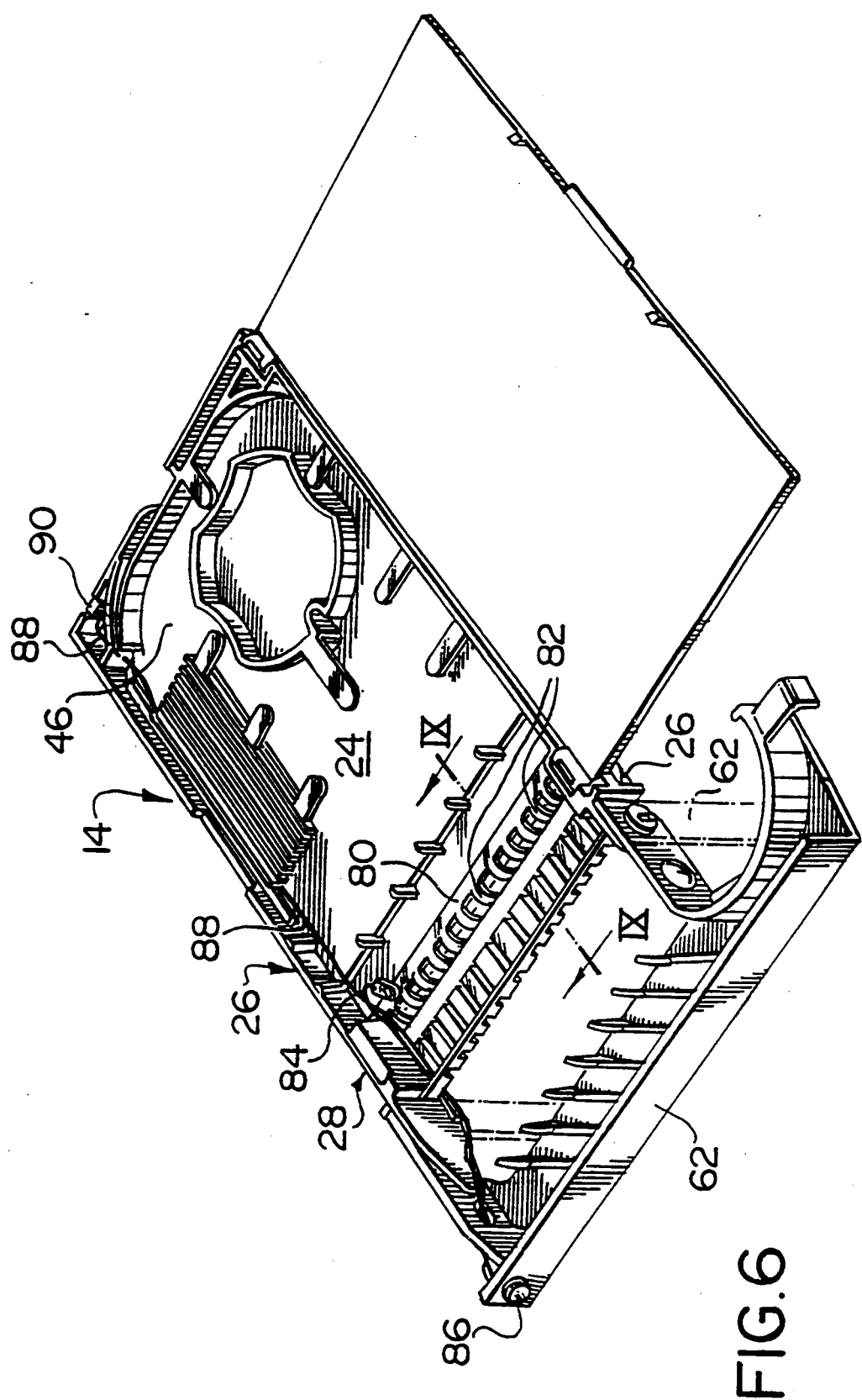
Figure 7:
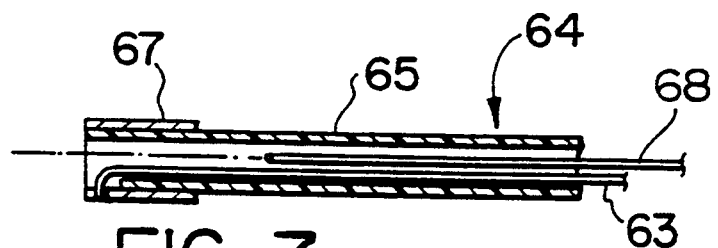
Figure 8:
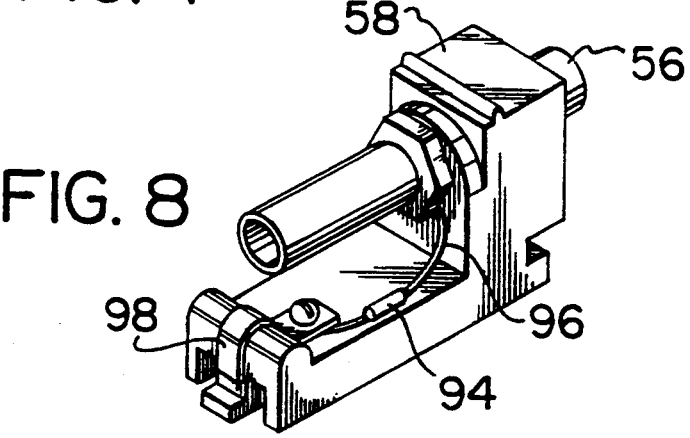
Figure 9:
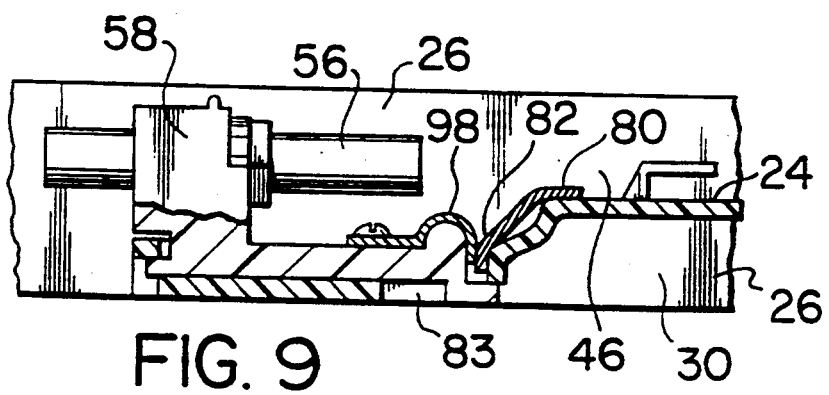
Figure 10:
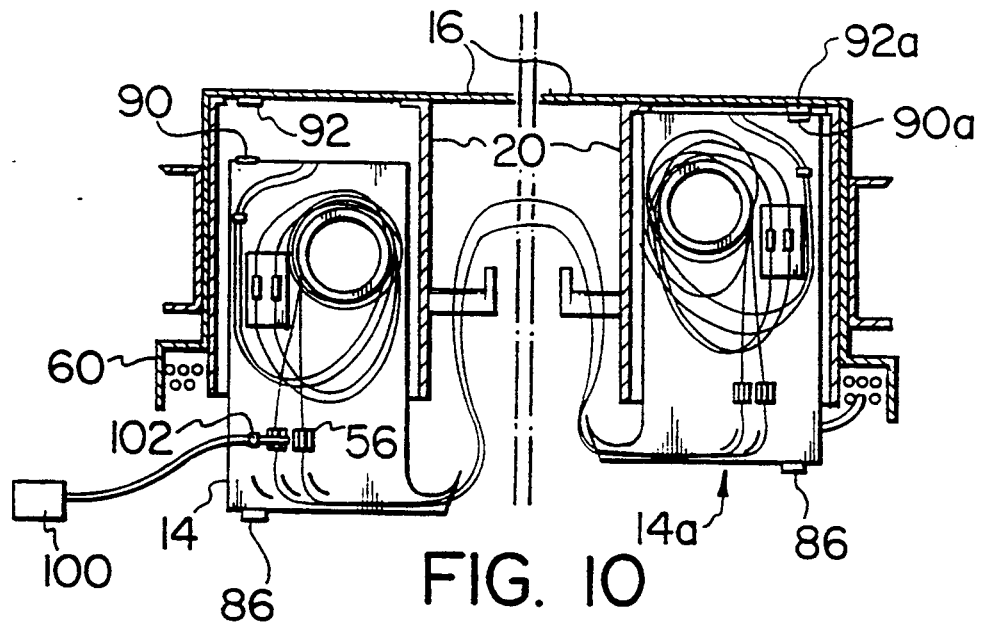
Figure 11:
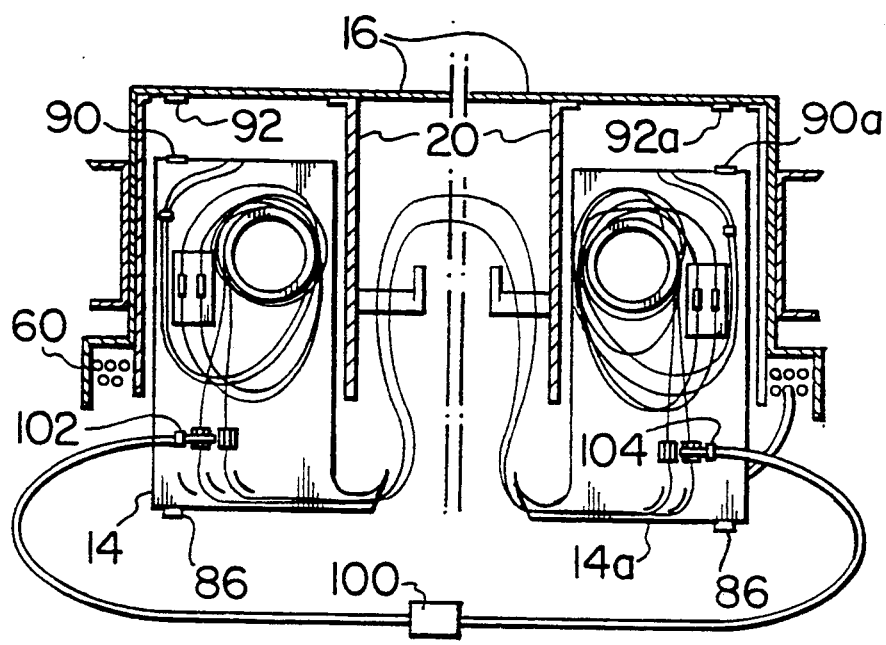
Figure 12:
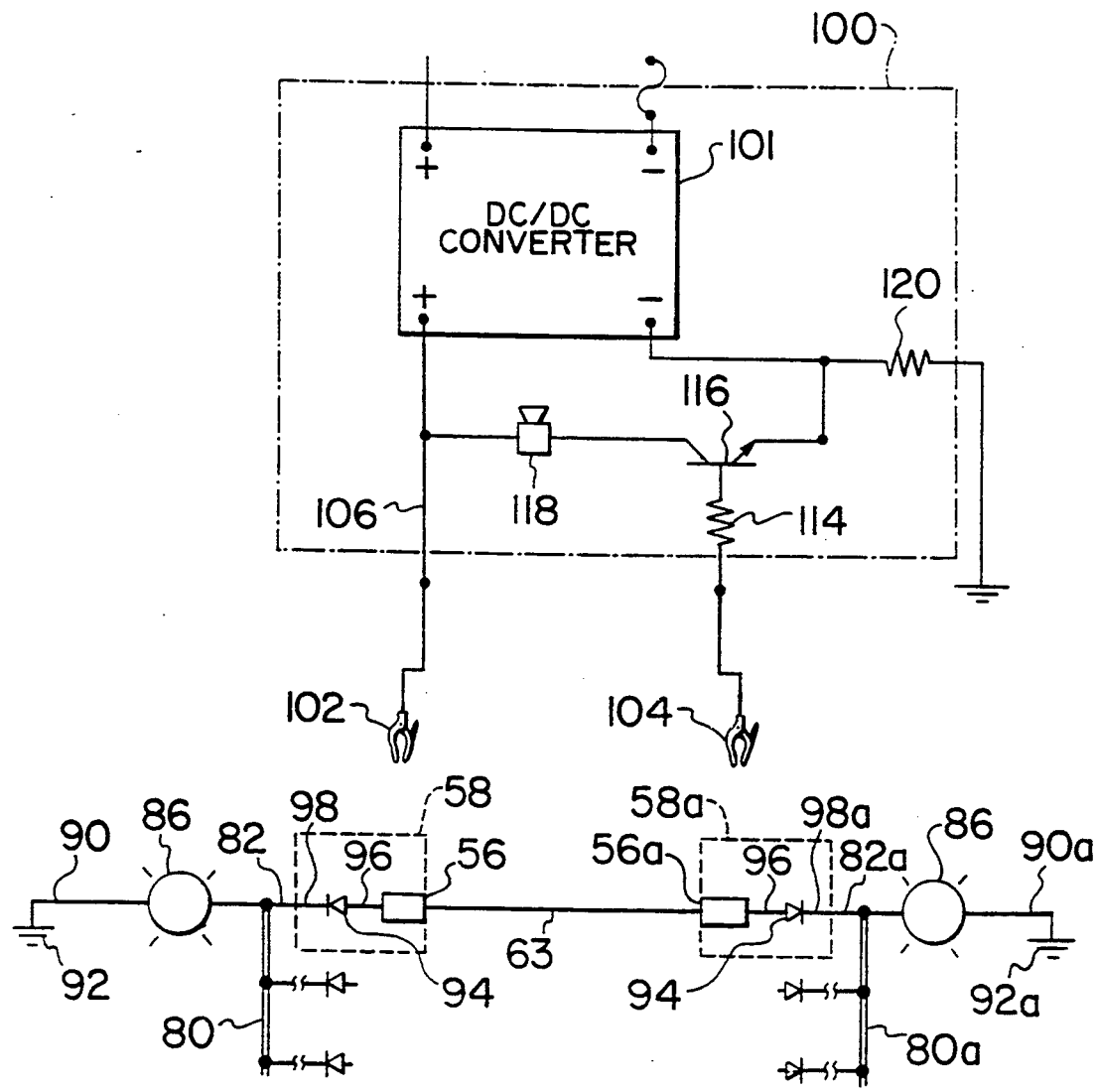

FIG. 5 isometric view upon the underside of the connector;

FIG. 6 is an isometric view similar to FIG. 4 but with connectors and optical fibers removed for clarity;

FIG. 7 is a cross-sectional view through an end portion at one end of a patch cord;

FIG. 8 is an isometric view upon a rear side of an assembly of optical fiber connector and mount and to a large scale;

FIG. 9 is a cross-sectional view taken along line IX—IX in FIG. 6 and showing an assembly of connector, connector mount and a holder;

FIG. 10 is a stepped cross-sectional view, through the combination, and showing a test means at one stage in operation;

FIG. 11 is a view similar to FIG. 10 showing the test means at a further stage of operation; and FIG. 12 shows part of a circuitry arrangement.

Figure 1:
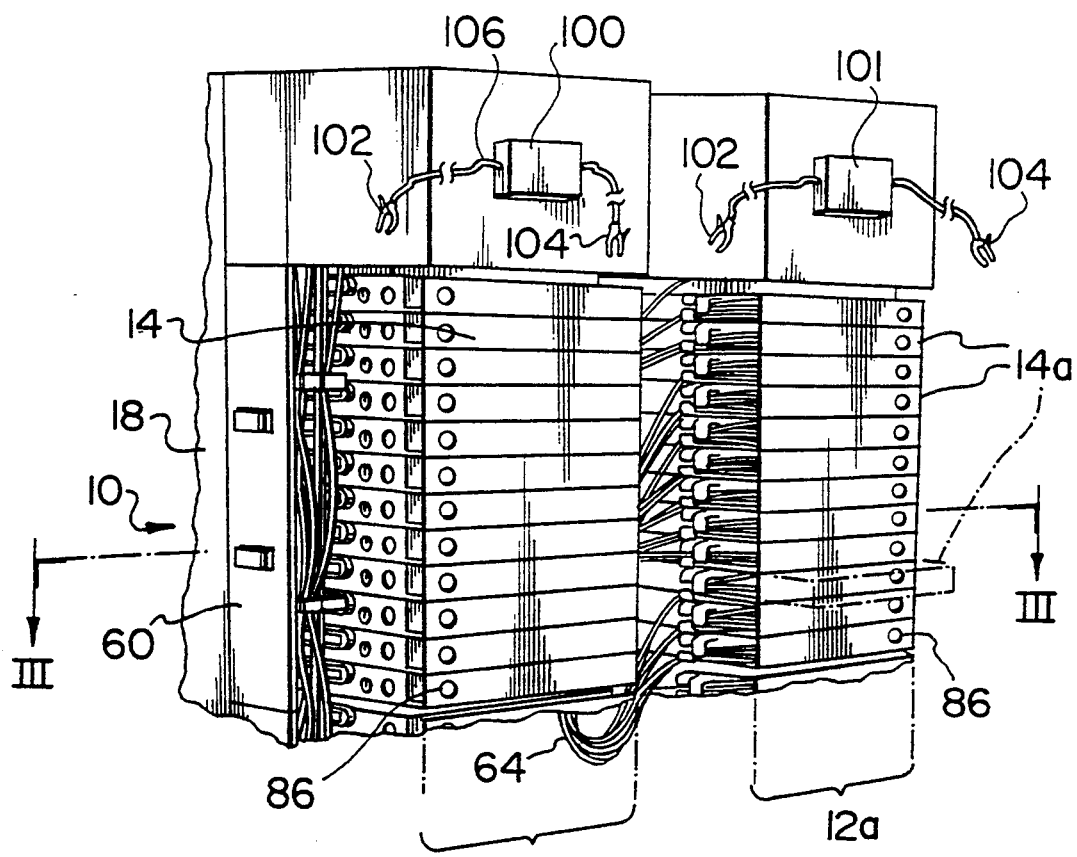
FIG. 1 is an isometric view of part of a distribution frame and optical connector holder combination.
Figure 3:
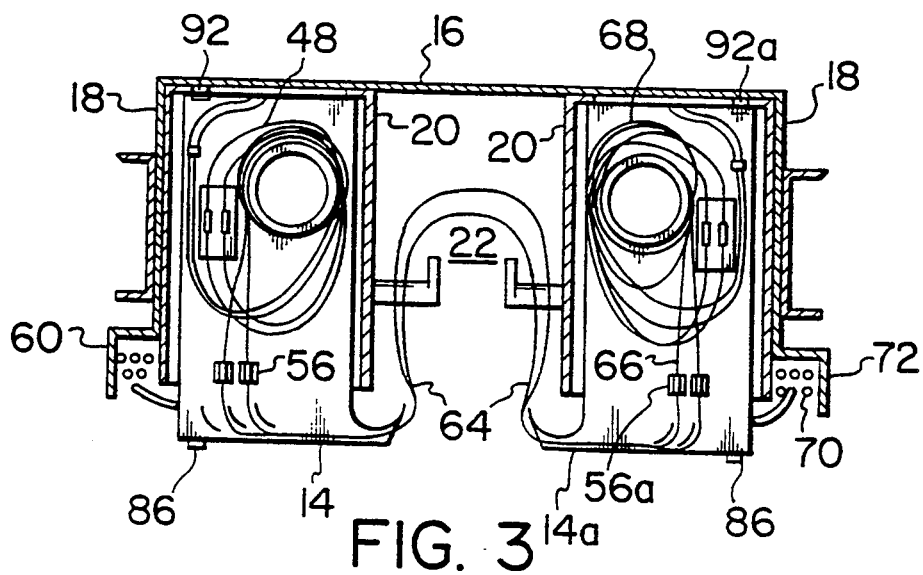
FIG. 3 is a cross-sectional view through the combination taken along line III—III in FIG. 1.
Figure 2:
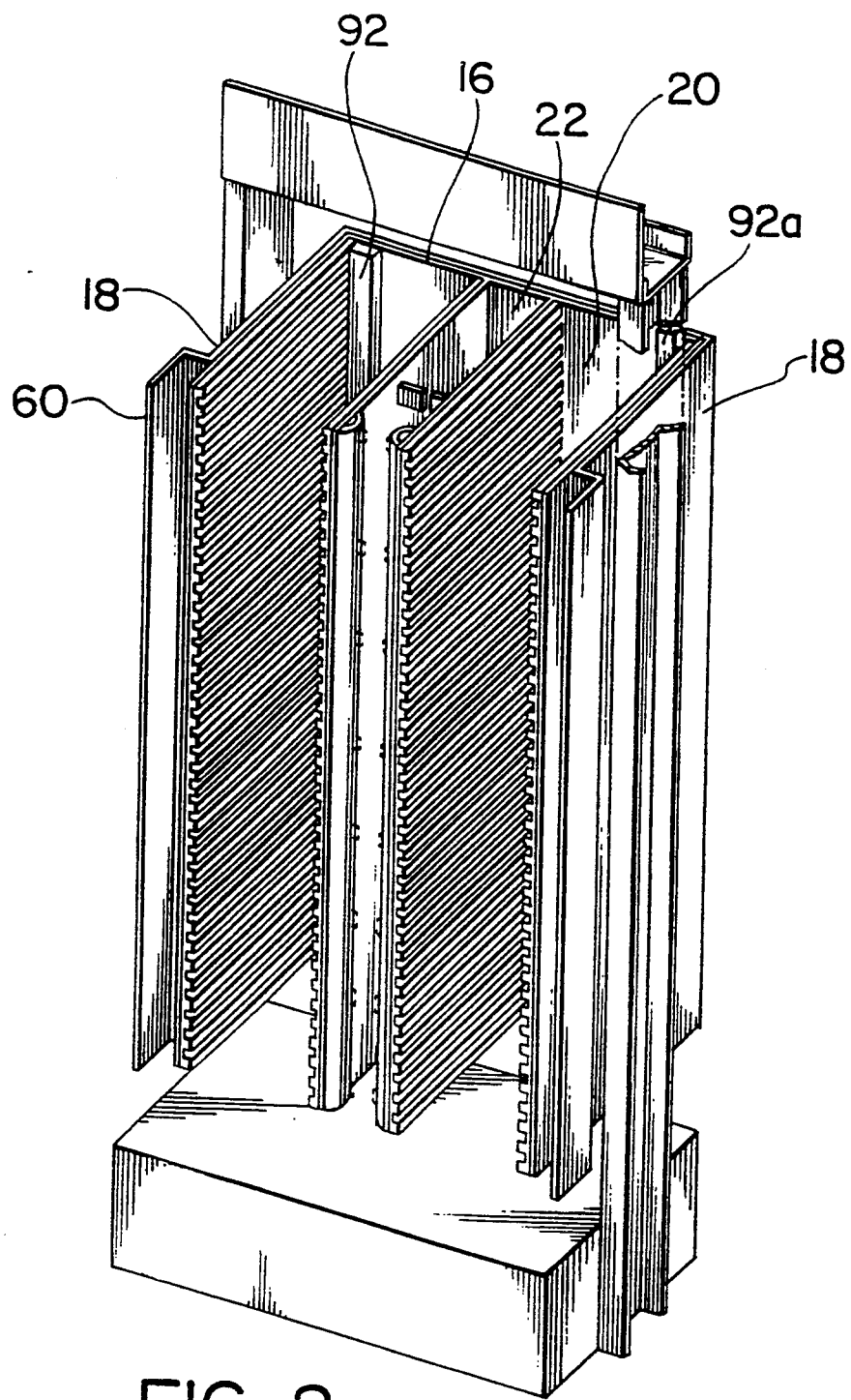
FIG. 2 is an isometric view of a supporting structure for holders within the distribution frame.

As shown in FIG. 1, in a distribution frame means and optical fiber holder combination, an optical fiber distribution frame 10 holds two vertical banks 12 and 12a of planar connectors for connecting a plurality of incoming optical fibers to outgoing optical fibers. The left-hand bank 12 accommodates holders 14 and the right-hand bank 12a has holders 14a. As shown in FIGS. 1, 2 and 3, the distribution frame comprises a rear wall 16, remote side walls 18 which extend from the rear to an open front of the frame. Between the side walls 18 are two other walls 20 which extend forwardly from the rear wall 16 and lie in parallel relationship to the side walls 18. For each bank 12, 12a, of connector holders 14, 14a, a side wall 18 and its corresponding wall 20 define between them receiving stations for the holders. The two walls 20 are spaced apart as shown in FIGS. 2 and 3 to provide a storage channel 22 for optical fibers leading from front end regions of connectors as will be described. The distance between the walls 20 is sufficient to ensure that where loops of fiber are to be disposed within the storage channel then these loops will not have a bend radius below a desired minimum. Each of the connector holders 14, 14a is insertable into a respective receiving station from the front of the distribution frame and is locatable in two positions in the respective station, i.e. in a rearward operative position as shown in FIG. 3 and in full outline in FIG. 1, and a forward connector access position as shown in chain-dotted outline in FIG. 1. The arrangement of the holders in the distribution frame and the construction of the distribution frame is basically similar to that described in U.S. Pat. No. 5,071,211 granted Dec. 10, 1991 and entitled "Connector Holders and Distribution Frame and Connector Holder Assemblies for Optical Cable" in the name of G. Debortoli et al. The subject matter given in the above U.S. patent is incorporated into this disclosure by reference.

Each of the connector holders 14, 14a, is basically of the structure described in U.S. Pat. No. 5,067,784 granted Nov. 26, 1991 and entitled "Connector Holders" in the name of G. Debortoli, et al. The subject matter disclosed in this latter patent is also incorporated into this application by reference. While each of the connector holders 14, 14a, is constructed in the manner described in U.S. Pat. No. 5,067,784, a brief description of each holder will now be given.

Each holder in the right-hand bank 12a is of opposite hand to those in the left-hand bank. In this description a holder 14 for the left-hand bank 12 will be described with the understanding that the holders 14a in the right-hand bank are of opposite hand. Each holder in the left-hand bank is planar. It has a planar base 24 (FIGS. 4 and 6). Side walls 26 extend to both sides of the base as shown. A mounting region 28 extends laterally across a front end region of the holder for optical connectors to be positioned therein (see particularly FIG. 6). As shown by FIG. 5 a storage compartment 30 is provided for incoming optical fibers 32 within a tube 34 which is one of a plurality of tubes forming the core of an incoming optical cable. The storage compartment 30 extends from the mounting region 28 to the rear end wall 36 of the holder. As disclosed in U.S. Pat. No. 5,067,784 a cover 38 is provided for the compartment 30, the cover being movable to allow for insertion of the tube 34 into the compartment 30. The tube passes around central structure 40 within the compartment 30, the structure 40 limiting the minimum diameter to which the tube may be reduced. As shown in FIGS. 4 and 6, a second compartment 46 on the other side of the base is for containing optical fibers 48 which extend from the tube 34 which passes from one compartment to the other through slot 50 provided for that purpose in the rear wall 36. The fibers 48 pass around an annular wall 52 which limits the minimum radius to which they may be formed. Pigtail fibers 54 also extend around the annular wall 52, the pigtail fibers and the fibers 48 being joined in a splice block 55 contained in the compartment 46. In assembled condition, the pigtail fibers 54 connect to rear ends of metallic optical connectors 56 which are retained in mounts 58 (see particularly FIGS. 7 and 8) which are mounted along the mounting region 28. The incoming cable is accommodated in a vertical channel 60 (see particularly FIG. 3). As shown particularly in FIGS. 4, 5 and 6, each holder 14 has a guard 62 extending forwardly from the mounting region, the guard being pivotally movable into a downwards location as shown chain-dotted in FIG. 6, in which location front ends of the connectors 56 are accessible for connecting patch cords 64 to the connectors.

As mentioned previously, the right-hand bank of holders 14a is of opposite hand structure to the left-hand bank of holders 14. Connectors 56a in the right-hand bank as shown by FIG. 3, have pigtail fibers 66 connected to fibers 68 of a distribution cable 70 which extends up a vertical channel 72 adjacent to the right-hand bank 12a. The fibers 68 are accommodated in the right-hand bank of holders 14a in a similar manner to that for the fibers 48 in the left-hand bank as described.

In the fully assembled condition, the patch cords 64 extend from respective connectors 56 in the left-hand bank of holders 14 to respective connectors 56a in the right-hand bank. The patch cords are of substantially the same length and superfluous length of patch cords are accommodated by being looped into the storage channel 22 as described in U.S. Pat. No. 5,071,211. Each patch cord is basically conventional in that it comprises a tube protected fiber 68 which extends between connectors 56, 56a in the right-hand and left-hand banks, the connectors being selectively connected as desired so that patch cord terminations may be in holders at different height positions. Hence, any connector 56 in one bank may be selectively connected to any connector 56a. Each patch cord differs from the conventional construction however, in that it also has an electrical conductor wire 63 (FIG. 7) enclosed within the protective tube 65, the conductor wire electrically connected, e.g. by soldering, to an outer conductive sleeve 67 at each end of the patch cord. This conductor wire is provided for reasons which will be described. Each sleeve 67 electrically engages within the corresponding connector 56 or 56a when the patch cord is connected between connectors. For the purpose of inserting the connectors 56 and 56a and their mounts 58, and for the purpose of attaching the patch cords, each selected holder 14, 14a in turn is moved forwardly into an inoperative position for access purposes as shown in chain-dotted outline in FIG. 1. When in use, however, the holders are moved rearwardly into their operative positions.

As may be seen from the above description, with the complete assembly of frame, connector holders and patch cords, when it is required to change interconnections between connectors, in the two banks of holders, this involves the tracing of individual patch cords from end to end to locate the connectors 56, 56a, at the ends of each patch cord. This may be an extremely difficult problem considering the amount of patch cords that may be extending at any one time between the two banks 12 and 12a. Even if connector identity designations are attached to front surfaces of the guards 62, it may still be a time consuming process to locate connectors.

To minimize the time involved and the possible tediousness in locating connectors, the embodiment includes an electrical test means which is operational for the purpose of quickly locating a corresponding connector at one end of a patch cord when a chosen connector has been located at the other end. This test means is additional to the structure described in previous patents. The test means comprises a signalling means provided upon each holder 14, 14a together with a corresponding conductor arrangement. As shown particularly in FIGS. 6 and 9, with regard to a holder 14 (holders 14a being of opposite hand) the conductor arrangement comprises a conductor bus 80 disposed in the compartment 46 of each holder, the conductor bus secured to the base 24 of the holder and extending laterally of the holder slightly rearwardly of the mounting regions 28. The conductor arrangement also provides for electrically connecting connectors 56 in parallel to the conductor bus 80 in each holder 14. This involves the use of short lateral conductor extensions 82 of the bus, these extensions being formed so as to extend down along the forward face of an inclined front end of the base 24 and into an aperture 83 at the rear side of mounting region. Each extension 82 is aligned with a corresponding mounting position for a connector 56. One end of the conductor bus 80 is electrically connected to a conductor wire 84 of the conductor arrangement and which extends to the front of the guard to be connected to the signalling means which for each holder is a light emitting member, i.e. a light emitting diode 86. A further conductor wire 88 extends from the diode for the full length of and close to the inside surface of an adjacent wall 26 of the holder to terminate in a terminal plate 90 (FIG. 6) which is bent over the rear end wall 36 of each holder so that the plate 90 extends down the rear surface of the rear end wall.

The test means also includes a frame conductor means. As shown by FIG. 2, for each bank 12 and 12a of receiving stations, the frame conductor means comprises a ground conductor bar 92, 92a extending vertically down the inside surface of the rear wall 16 of the distribution frame. The terminal plate 90 of each individual holder 14 in the left-hand bank 12 is independently electrically connected to the ground conductor bar 92 when that holder is in its rearward operative position.

Means is also provided by the conductor arrangement corresponding to each signalling means to allow for unidirectional flow of current from each connector 56 to the ground. This particular means is provided by a diode 94 (FIG. 8) supported upon each connector mount 58 and included in a bridging conductor 96 which terminates at one end in electrical connection with the corresponding connector 56 and at the other end in a downward terminal plate 98 extending over the rear edge of the mount. With the connectors 56 in their mounts 58 and the mounts disposed in the mounting positions (FIG. 9), the terminal plates 98 are in sliding electrical contact with their individual lateral conductor extensions 82 of the conductor bus 80 whereby the bus 80 is common to all the diodes 94.

The test means further includes a junction box means comprising a main junction box 100 (FIGS. 1 and 12) secured to the upper cover of the frame above bank 12 and a subsidiary junction box 101 above the bank 12a. Electrically connected into terminals of each junction box 100 and 101 are electrical probes comprising electrical gripping jaws 102 and 104 for each box and flexible electrical wires 106 to each of the gripping jaws. Gripping jaws 102 are provided for input of electrical current and jaws 104 are for the output. The electrical wires 106 may be mounted upon retractable devices which are spring urged to withdraw them to retracted positions with the gripping jaws close to the junction boxes when not in use.

For convenience, the electrical circuitry connects the two junction boxes 100 and 101 so that either of the clamps 102 or either the clamps 104 may be used as desired while completing a circuit for buzzer operation. Conveniently, in this embodiment, the box 100 at the top of the left-hand bank 12 contains a d.c./d.c. converter 110 to convert a low voltage d.c. (i.e., 52 volts d.c.) into a relatively lower voltage (i.e., 12 volts d.c.) for use with the circuitry arrangement. The box 100 also contains circuitry associated with the converter. The clamps 102 and 104 of the junction box 100 are connected from the converter in parallel, respectively, with the clamps 102 and 104 of box 101.

Normally, when in use, and as specified above, the holders are in their operative positions shown by FIG. 3. However, in situations where it is required to remove a particular patch cord 64 then both ends of the patch cord need to be located. A holder in one of the banks e.g. a holder 14 in left-hand bank 12, holds a particular connector to which one end of the patch cord of interest is attached. This holder 14 is moved forwardly to its non-operative position. This effectively electrically disconnects the terminal plate 90 at the rear of the holder from the ground bar 92 of that particular bank. The connector 56 in the holder and at the one end of the patch cord which requires to be moved is located and the input gripping jaw 102 is drawn downwardly from the junction box 100 above bank 12 and is clamped around the connector as shown diagrammatically in FIG. 10. An electrical current is then passed through the jaw 102 and into the connector 56. This current cannot pass to the ground bar 92 associated with the holder in the left-hand bank because of the ground disconnection. Instead, the current passes through the electrical connection between the connector 56 to the contacting sleeve 67, along the conductor wire 63 of the respective patch cord, through the corresponding connector 56a in a holder of the right-hand bank 12a, and into the ground bar 92a for the right-hand bank by way of the diode 94 and common bus 80. Passage of the current results in operation of the light emitting diode 86 in the particular holder 14a in the right-hand bank. This thus identifies the holder 14a within which the corresponding connector 56a is located. It should be stressed at this point that the cross-section of FIGS. 10 and 11 may not be a typical planar cross-section, but is a multiple cross-section in which the left- and right-hand sides may be of different heights dependent upon the holder positions which are being considered.

The next step is to move the identified holder 14a in the right-hand bank into its accessible position forwardly in the distribution frame so that the ground connection to the respective ground bar 92a is disconnected. This is the situation shown by FIG. 11. With both holders 14, 14a in their forward accessible positions, as shown by FIG. 11, and with the gripping jaw 102 still connected to the connector in the holder 14 of the left-hand bank 12, one of the gripping jaws 104 is used to locate the corresponding connector 56a in the identified holder 14a. Jaw 104 may be moved selectively along the connectors 56a in the holder 14a until the corresponding connector is located. When the jaw 104 is contacted with a connector 56a in the holder 14a which is not the corresponding connector, then no circuit is completed because the conductor wire 63 in the patch cord under consideration does not extend to that connector 56a. However, upon the gripping jaw 104 contacting the corresponding connector 56a to which the particular patch cord does extend then an electrical current may be passed from the clamp 102 through the conductor 63 in the patch cord and to the clamp 104 to return to one of the junction boxes 100. The test means includes an indicating means to show when such a circuit has been made. This indicating means is conveniently, in this embodiment, an electrical buzzer electrically connected into the circuit and mounted within one of the junction boxes or close thereto. Parts of the test means are shown diagrammatically in FIG. 12. Upon an engineer hearing the sound of the buzzer, he knows immediately that he has located the corresponding connector 56a in the identified holder 14a.

Further, upon the current passing through the patch cord of interest from the clamps 102 to 104, current passes in the wire 106 through the patch cord conductor 63, shown diagrammatically in FIG. 12, and through a resistor 114 to activate the gate of a transistor 116 for operation of the buzzer 118. The circuitry is arranged such that should a gripping clamp 104 contact ground inadvertently, i.e. such as by contacting a part of the framework, then the resistor 114 thus placed in parallel with resistor 120 is such that the shunting effect is less than 10% to provide overcurrent protection for the light emitting diodes 86 mounted on the fronts of the holders 14, 14a.

As may be seen from the above description, the method of testing provides a simple, quick, and accurate method of locating a connector at one end of a patch cord when the connector at the other end of the patch cord has already been located.

In a modification of the embodiment (not shown), designations may be provided across the front surfaces of the guards 62 of each of the holders 14, 14a to designate the purpose of each connector 56, 56a mounted in its respective holder. While reliance should be placed on such designations for the location of the respective connectors at the two ends of a particular patch cord, it is always possible that after changing connections in the distribution frame between connectors that the designations on the guards have not been correspondingly changed. Such a situation is potentially dangerous in that patch cords may be removed from connectors which are in use and which could result in emission of a light signal potentially damaging to an eye which is exposed to it. Hence, the above-described test arrangement ensures that the correct connectors are being located.

What is claimed is:

1. A distribution frame and optical connector holder combination comprising:

distribution frame means for receiving a plurality of connector holders;

a plurality of optical connector holders receivable within the frame means, the holders having mounting means for positioning a plurality of optical connectors which, when mounted, have first ends which, in different holders, are for selective optical interconnection by patch cords each extending from one of said connectors to another of said connectors and second ends for connection to optical fibers in the holders;

and signal transmission test means which, when each patch cord interconnects selected first ends of associated connectors and each of said patch cords is provided with a signal transmission member extending from end to end of the patch cord, is operational to locate both ends of a particular patch cord, the test means being disposable at one end of the particular patch cord to transmit a signal through the transmission member of the particular patch cord to provide an indication of the location of the other end of the particular patch cord.

* * * * *